United States Patent
Dantuluri et al.

(10) Patent No.: US 11,704,484 B2
(45) Date of Patent: Jul. 18, 2023

(54) CROSS CHANNEL DIGITAL DATA PARSING AND GENERATION SYSTEM

(71) Applicant: BANK OF AMERICA CORPORATION, Charlotte, NC (US)

(72) Inventors: Indradeep Dantuluri, Harrisburg, NC (US); Charanjit S. Bagga, Thousand Oaks, CA (US); Muralidhar Chowdarapu, Simi Valley, CA (US); Burton M. Covnot, Carol Stream, IL (US); Sandeep Gandhi, Waxhaw, NC (US); Ryan Scott Heller, Middletown, DE (US); Saurabh Khanna, Frisco, TX (US); Silvia Adriana Krasuk, Los Angeles, CA (US); Mardochee Macxis, Concord, NC (US); Walter Thomas Robinson, Charlotte, NC (US); Rupal V. Shah, Loomis, CA (US); Mansoor Zafar, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/517,699

(22) Filed: Nov. 3, 2021

(65) Prior Publication Data
US 2022/0350958 A1 Nov. 3, 2022

Related U.S. Application Data

(60) Provisional application No. 63/182,367, filed on Apr. 30, 2021.

(51) Int. Cl.
*G06F 17/00* (2019.01)
*G06F 40/186* (2020.01)
(Continued)

(52) U.S. Cl.
CPC ............ *G06F 40/186* (2020.01); *G06F 3/167* (2013.01); *G06F 9/451* (2018.02); *G06F 40/106* (2020.01);
(Continued)

(58) Field of Classification Search
None
See application file for complete search history.

(56) References Cited

U.S. PATENT DOCUMENTS 5,794,205 A 8/1998 Walters et al.
9,361,598 B2 6/2016 Bird
(Continued)

FOREIGN PATENT DOCUMENTS

WO 2017059500 A1 4/2017

*Primary Examiner* — Mustafa A Amin
(74) *Attorney, Agent, or Firm* — Moore & Van Allen PLLC; Andrew T. Wood (57) ABSTRACT

Embodiments of the invention are directed to a system, method, or computer program product for a template based design approach for cross channel digital data parsing and generation. The system allows for onboarding of various types of forms to push them out to users via multiple various user viewing channels. The invention identifies the sections or fields of the form that require user input and presents those fields using an advanced digital solution illustrated in the channel format. The system is expandable, allowing for a single backend upload of additional forms irrespective of the channel.

12 Claims, 8 Drawing Sheets

(51) Int. Cl.
*H04L 67/04* (2022.01)
*G06F 40/106* (2020.01)
*G06F 40/174* (2020.01)
*G06F 40/123* (2020.01)
*G06F 3/16* (2006.01)
*G06F 9/451* (2018.01)

(52) U.S. Cl.
CPC .......... *G06F 40/123* (2020.01); *G06F 40/174* (2020.01); *H04L 67/04* (2013.01)

(56) References Cited

U.S. PATENT DOCUMENTS

| | | |
|---|---|---|
| 9,639,597 B2 | 5/2017 | Eigner et al. |
| 9,736,540 B2 | 8/2017 | Anderson et al. |
| 9,965,151 B2 | 5/2018 | Zaveri et al. |
| 10,127,250 B2 | 11/2018 | Dingman et al. |
| 10,372,733 B2 | 8/2019 | Eigner et al. |
| 10,585,982 B2 | 3/2020 | Brisebois et al. |
| 10,643,164 B2 | 5/2020 | Macciola et al. |
| 10,686,772 B2 | 6/2020 | Haddad |
| 10,699,349 B2 | 6/2020 | Roberts et al. |
| 10,796,370 B2 | 10/2020 | Rakshe et al. |
| 10,838,699 B2 | 11/2020 | Dayanandan |
| 10,839,141 B2 | 11/2020 | Warila et al. |
| 11,029,838 B2 | 6/2021 | Lemay et al. |
| 11,113,333 B2 | 9/2021 | Maharajh et al. |
| 11,140,233 B2 | 10/2021 | Glommen et al. |
| 11,228,617 B2 | 1/2022 | Raleigh |
| 11,228,640 B2 | 1/2022 | Singh et al. |
| 2002/0194219 A1 | 12/2002 | Dawd et al. |
| 2007/0180148 A1* | 8/2007 | Yadidian .............. G06F 40/174 709/246 |
| 2007/0198910 A1* | 8/2007 | Jensen ................. G06F 40/174 715/234 |
| 2007/0233495 A1 | 10/2007 | Agapi et al. |
| 2009/0138794 A1 | 5/2009 | Becker et al. |
| 2011/0191156 A1 | 8/2011 | Etheredge et al. |
| 2011/0320605 A1 | 12/2011 | Kramer et al. |
| 2012/0054593 A1 | 3/2012 | Naderi |
| 2012/0159314 A1 | 6/2012 | Schrier et al. |
| 2013/0013710 A1 | 1/2013 | Wilson et al. |
| 2013/0021377 A1 | 1/2013 | Doll |
| 2013/0198628 A1 | 8/2013 | Ethier et al. |
| 2013/0283195 A1 | 10/2013 | Bilgen et al. |
| 2014/0222553 A1 | 8/2014 | Bowman |
| 2014/0223277 A1* | 8/2014 | Kimber ................ G06F 40/174 715/223 |
| 2014/0330659 A1 | 11/2014 | Yopp et al. |
| 2015/0039988 A1 | 2/2015 | Mei |
| 2016/0196110 A1 | 7/2016 | Yehoshua et al. |
| 2016/0196499 A1 | 7/2016 | Khan et al. |
| 2017/0192950 A1 | 7/2017 | Gaither et al. |
| 2018/0046609 A1 | 2/2018 | Agarwal et al. |
| 2018/0239837 A1 | 8/2018 | Wang |
| 2019/0057161 A1 | 2/2019 | Ackerman et al. |
| 2019/0179885 A1* | 6/2019 | Wong ................... G06F 40/174 |
| 2019/0238614 A1 | 8/2019 | Ballinger |
| 2020/0401648 A1 | 12/2020 | Kol et al. |
| 2021/0157618 A1 | 5/2021 | Moon |
| 2021/0326093 A1 | 10/2021 | Hinckley et al. |

* cited by examiner

NAVIGATE ACTION 802
```
{
"action": "navigate",
"navigateTo": "Names"
}
```

COLLECT ACTION 804
```
{
"action": "collect",
"widgets": [
  {
    "dataId": "firstName",
    "widgetID": "nameTXT"
  }
]
}
```

ENABLE ACTION 806
```
{
"action": "enable",
"widgets": [
"Continue_Button"
]
}
```

Figure 8b
810

DISABLE ACTION 812
```
{
"action": "disable",
"widgets": [
"Continue_Button"
]
}
```

ERROR ACTION 814
```
{
"action": "error",
"target": "id"
}
```

DELEGATE ACTION 816
```
{
"action": "delegate",
"context": "Reason",
}
```

CROSS CHANNEL DIGITAL DATA PARSING AND GENERATION SYSTEM

CROSS-REFERENCE TO RELATED APPLICATIONS

This application is a U.S. Non-provisional application claiming priority to U.S. Provisional Patent Application No. 63/182,367 filed Apr. 30, 2021 titled Cross Channel Digital Forms Integration and Presentation System, the contents of which are hereby incorporated by reference in its entirety.

BACKGROUND

Currently, there are a multitude of types of forms for users that have various presentations, structures, and requirements. Typically, depending on the entity, the form may have unique structure specific to that form. When digitizing these forms several challenges arise such as displaying forms on a mobile device, onboarding of each form and each template, and allowing for inline editing. As such, a need exists for a cross channel digital data parsing and processing system to prepare the form for channel-specific viewing and completion.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for a cross channel digital data parsing and generation.

Currently, there are many different types of user forms, from government forms, to financial forms, to contracts, agreements, and the like. These forms often contain multiple pages of uniquely formatted content and instructions. The system is able to digitize these forms irrespective of the user channel in order for the user to accurately view and fill out the forms. Currently, the challenges with digitizing such forms include locating, gathering, and extracting relevant input fields, assigning and storing variables using a template generation tool, assigning rules and logic for display and transition attributes, and preparing outputs of channel-agnostic data capturing codes to accept inputs from each input field in a variety of channels.

The invention enables onboarding of various types of forms to push them out to users that may be using any channel, such as different operating systems, mobile, web, voice-assistants, multi-channel cognitive resource platforms, or the like. As such, the invention provides a cross channel solution leveraging each channel's technology. In this way, the system displays or presents a form in an aesthetic manner that a channel's native operating system would provide. The invention identifies the sections or fields of the form that require user input to be completed and presents those fields using an advanced digital solution and posts the user inputs to a backend server to generate a populated digital form. The system then reconstructs the original form with the inputs provided by the user. The system is expandable, allowing for a single backend upload of additional forms irrespective of the channel.

The system allows for creation of outputs, comprising objects, using a template generation tool. In this way, a user associated with an entity may use a template generation tool on a user interface to import a pre-existing form and extract the relevant information into the system. In this way, within the template generation tool a user associated with an entity is able to select field input type, security requirements, transition rules, display rules, and the like, in order for the template generation tool to generate outputs comprising a flow object and a data object. In some embodiments described herein, the system does not require a user associated with an entity to make these selections, rather the system is capable of processing this information autonomously, and may only require validation from a user associated with an entity after the processing is complete.

The system follows a template-based design approach and an object-based implementation approach. In this way, each client channel will host an implementation method, via a UI (user interface) template for how a particular object should be applied via that channel to present to a user. Each client channel will be able decide how the UI interprets the outputs of the template generation tool, the data object and the flow object. Once on a user interface of a channel, a UI template comprises the data object and the flow object, and the UI template determines how the presentations of these outputs of the template generation tool are organized, the color, the layout, and the like. In this way, the client channel controls these elements of the form when displayed to the user via the UI template. In this way, the system provides predetermined objects that are channel-agnostic that can be repurposed for any kind of form regardless of complexity.

Embodiments of the invention are directed to a system, method, or computer program product for cross channel digital data parsing and generation, the invention comprising receiving a form comprising one or more input fields; locating the input fields comprising one or more header fields and one or more response fields; extracting information from the form; inserting the extracted information into a template generation tool; presenting the template generation tool; receiving, as an input, form prompt rules comprising display rules and transition rules; generating outputs from the template generation tool, the outputs comprising a data object and a flow object; and storing the outputs in a repository.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to a system, method, or computer program product for an object-based approach for cross channel digital data parsing and generation. The system allows for onboarding of various types of forms to push them out to users via multiple various user channels. The invention identifies the sections or fields of the form that require user input and presents those fields to a template generation tool to be transformed into various objects including, but not limited to, a flow object and a data object. The system is expandable, allowing for a single backend upload of additional forms irrespective of the channel.

As used herein, a "user" may be an individual in communication with an entity and reviewing one or more forms or documents associated with the communication or otherwise utilized the applications disclosed herein. A user may be a customer, representative of a customer, employee of an entity ("user associated with an entity"), and the like.

As used herein, an "entity" refers to any organization that processes transactions or requires users to complete forms, including, but not limited to, banks, credit unions, savings and loan associations, investment companies, stock brokerages, capital management firms, insurance companies, tax preparation organizations, and the like.

As used herein, a "channel" or "channel client" refers to any method of communication used by an entity to interact with its users, or used by users to interact with an entity, including, but not limited to, computer webpages, mobile device applications, mobile device web services, telephone communications, text/SMS messages, voice-enabled personal assistants, facsimile, postal services, and the like.

In some embodiments of the invention, a channel may comprise a multi-channel cognitive resource platform for performing electronic activities in an integrated manner from a single interface. The multi-channel cognitive resource platform is configured for adapting to the user's natural communication and its various modes by allowing seamless switching between communication channels/mediums in real time or near real time. The system is configured to receive, recognize, and interpret these linguistic phenomena of the user input and perform user activities accordingly. In this regard, the system is configured for natural language processing and computational linguistics. Based on analyzing the received activity input, the system is configured to determine the user activity that the user seeks to perform. Here, in general, the system may parse the activity input from the user to detect one or more words that make up the activity input from the user. The system may then analyze words to determine the user activity. For example, the system may receive the following voice activity input from the user: "Complete my form." The system may then analyze the one or more words to determine that the caller wants to complete a form, for example, based on identifying keywords such as, "complete" and "form". The system may then proceed to perform the form completion through the user interface.

As used herein, a "user interface" or "user device" is any device or software of a channel that allows a user or a user associated with an entity to input information, such as commands or data, into a device, or that allows the device to output information to the user. For example, the user interface may include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. In some embodiments, the term "platform" including the temporal platform may refer to a platform that is used as a base upon which other applications, processing, or technologies are distributed including applications, activities, integration into currently used applications, integration into systems, presentation of user interfaces, and the like.

Further, the embodiments described herein may refer to use of a "form". A form may be any physical or digital document requiring a user to fill out, complete, review, or otherwise mark in association with a communication with an entity. A form may provide long or short bodies of text followed by a user prompt. Hereinafter, the embodiments described may refer to the long or short bodies of text followed by a user prompt or question as a "header field", or "header", and the portion of the form requiring user input as an "response field". An "input field", or "user input field" defines the sections of the form comprising both a header field combined with a response field.

In some embodiments described herein, a header field may be a simple question or prompt such as "Address", "Date of Birth", and the like. The header field is configured to provide the user with detailed or general information regarding the type of response expected in the response field. In some embodiments, the header field may be a sentence, phrase, acronym, and the like. In other embodiments described herein, the header field may only be a number, Roman numeral, letter, symbol, or another combination of alphanumeric characters configured to describe the type of input required in the response field. For example, some forms may comprise one or more index tables providing a list of numbers, letters, symbols, or other combinations of alphanumeric characters, alongside a long-form description of the type of input required in the response field to satisfy the form requirements. In this way, the header field of the input field may ask the user to cross-reference the one or more index table to determine the appropriate response in the response field. In some embodiments described herein, the one or more index tables may be presented to the user via the user channel alongside each user input. In yet other embodiments described herein, the system may parse and cross-reference the singular index table for the corresponding long-form description associated with the truncated header field. In such a system, the truncated header field comprising a number, letter, symbol, or the like, may be automatically substituted and presented to the user with the long-form description found in the one or more index tables.

In some embodiments described herein, the response fields of the form may comprise text boxes for users to manually write or type a response. In some embodiments described herein, the response fields may comprise dropdowns, checkboxes, toggles, sliders, radio buttons, signature fields, and the like. Depending on the header field, the user may be prompted to select one or more options as a response. In some embodiments of the invention, a header field may prompt a user to circle one or more appropriate responses. In this way, the system may be configured to convert the individual responses capable of being circled into corresponding dropdowns, checkboxes, toggles, sliders, radio buttons, and the like.

In some embodiments described herein, the template generation tool may comprise a feature which allows for the user associated with an entity to simulate the truncated form as it would be viewed by a user on a channel after the UI template on the channel has performed reconstruction of the form. For example, the template generation form may first present the user associated with an entity with various options for how to display a header field or response field, and then subsequently present a "preview" button to allow the user associated with an entity to test the truncated form output on one or more channel UI template simulations of choice. In some embodiments, this may comprise a simulated two-dimensional representation of the screen of a mobile device, in other embodiments, the channel simulation may comprise configured for auditory feedback to the user of an entity to simulate a multi-channel cognitive resource platform. It should be understood that any channel may be capable of being previewed, and as previously described, a "channel" or "channel client" refers to any method of communication used by an entity to interact with its users, or used by users to interact with an entity, including, but not limited to, computer webpages, mobile device applications, mobile device web services, telephone communications, text/SMS messages, voice-enabled personal assistants, facsimile, postal services, and the like.

In some embodiments described herein, the template generation tool may provide an ability to classify response fields for enhanced security. The template generation tool may provide an alert to the user associated with an entity, such that the response field and/or the header field within the template generation tool is subject to additional security requirements. In this way, the template generation tool allows for selection of how to display character or selections chosen or input by the user during the form completion process. For example, the template generation tool may recognize that the header field "social security number" or "SSN" is commonly expected to prompt the user to input confidential information, and that the form ought to transform and display the alphanumeric inputs from digits such as "123-45-6789" into hidden symbols such as "*--****" and the like. In this way, the form anticipates that any $3^{rd}$ party onlookers of the user interface of a channel may be malicious, and preemptively asks to display the sensitive digits in the manner previously discussed. In some embodiments described herein, the system may allow the user associated with an entity to select response field classifications for any number of question inputs, should the system not automatically recognize these security requirements for a common header field or response field.

Figure 1:
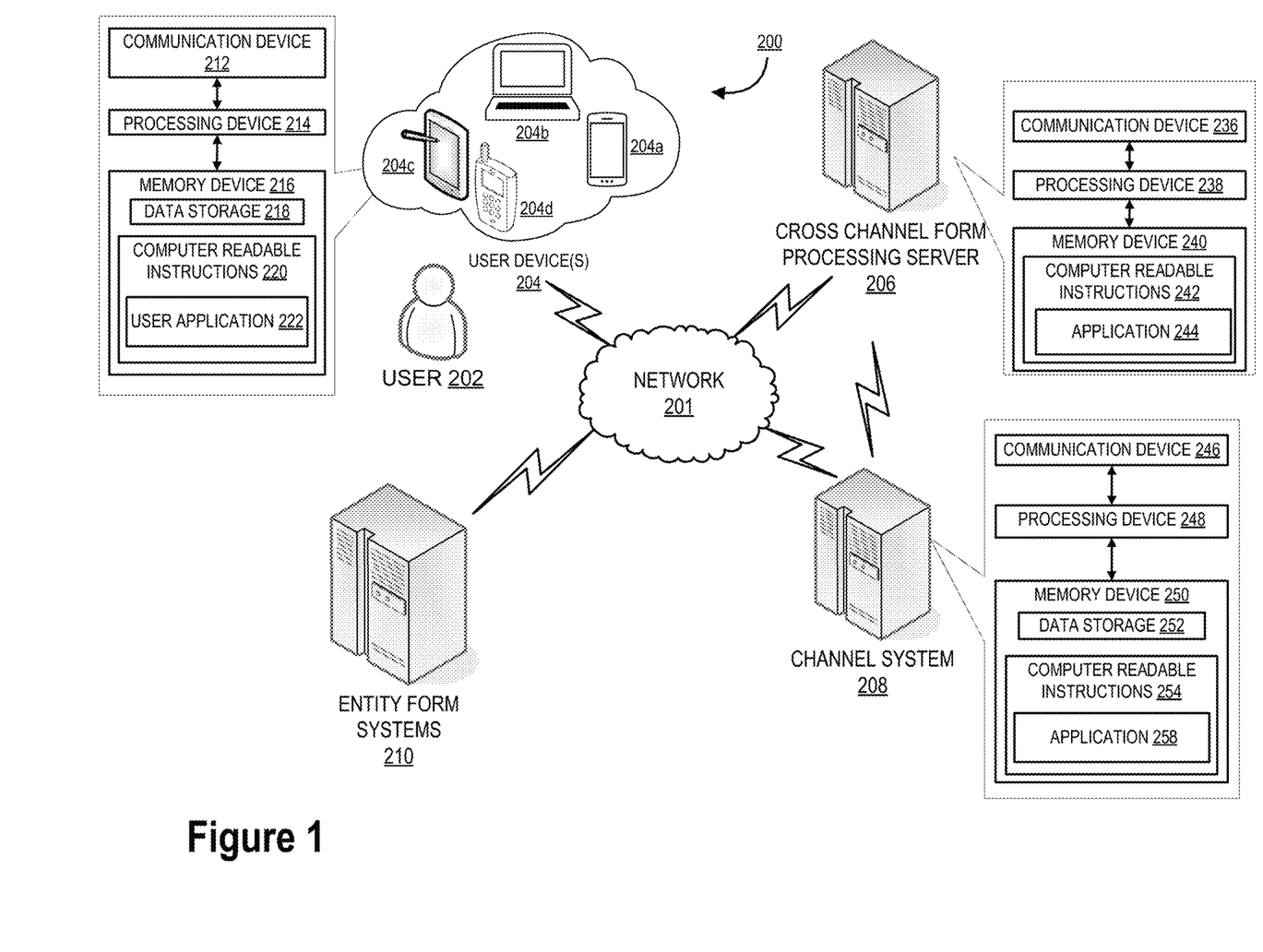
FIG. 1 provides a cross channel digital data parsing and generation environment, in accordance with one embodiment of the present invention.

FIG. 1 provides a cross channel digital data parsing and generation system environment 200, in accordance with one embodiment of the present invention. As illustrated in FIG. 1, the channel system 208 is operatively coupled, via a network 201 to the user device 204, to the cross-channel form processing server 206, and to entity form systems 210. In this way, the channel system 208 can send information to and receive information from the user device 204, the cross-channel form processing server 206, and the entity form systems 210. FIG. 1 illustrates only one example of the system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

As illustrated in FIG. 1, the channel system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the cross channel form processing server 206, the user device 204, and the entity form systems 210. As such, the communication device 246 generally comprises a modem, server, or other device for communicating with other devices on the network 201.

As further illustrated in FIG. 1, the channel system 208 comprises computer-readable instructions 254 stored in the memory device 250, which in one embodiment includes the computer-readable instructions 254 of an application 258. In some embodiments, the memory device 250 includes data storage 252 for storing data created and/or used by the application 258. In the embodiment illustrated in FIG. 1 and described throughout much of this specification, the application 258 may perform the functions disclosed herein. The channel system 208 recognizes the channel the user is using and requests form. The system may use the appropriate form for the user and for the channel selected by the user.

As illustrated in FIG. 1, the cross channel form processing server 206 generally comprises a communication device 236, a processing device 238, and a memory device 240. As further illustrated in FIG. 1, the cross channel form processing server 206 comprises computer-readable instructions 242 stored in the memory device 240, which in one embodiment includes the computer-readable instructions 242 of an application 244.

In the embodiment illustrated in FIG. 1, the application 244 allows the cross channel form processing server 206 to be linked to the channel system 208 to communicate, via a network 201, the information related to transactions associated with entity form systems 210.

FIG. 1 also illustrates a user device 204. The user device 204 may be any communication device such as a smart phone 204*a*, a telephone 204*d*, a tablet 204*c*, a computer 204*b*, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the cross channel form processing server 206, the channel system 208, and the entity form systems 210. As such, the communication device 212 generally comprises a modem, server, or other device for communicating with other devices on the network 201.

As further illustrated in FIG. 1, the user device 204 comprises computer-readable instructions 220 stored in the memory device 216, which in one embodiment includes the computer-readable instructions 220 of a user application 222. A user device 204 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, voice assistants, laptop computers, cameras, video recorders, audio/video player, radio, GPS devices, any combination of the aforementioned, or the like. Although only one user device 204 is depicted in FIG. 1, the system environment 200 may comprise a plurality of mobile devices 204.

The entity form systems 210 are operatively coupled to the channel system 208, the cross channel form processing server 206, and/or the user device 204 through the network 201. The entity form systems 210 have systems with devices the same or similar to the devices described for the channel system 208, the cross channel form processing server 206, and/or the user device 204 (i.e., communication device, processing device, and memory device). Therefore, the entity form systems 210 communicate with the channel system 208, the cross channel form processing server 206, and/or the user device 204 in the same or similar way as previously described with respect to each system.

As such, the entity form systems 210 generally comprises a communication device, at least one processing device, and a memory device. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device is operatively coupled to the communication device and the memory device. The processing device uses the communication device to communicate with the network 201 and other devices on the network 201. As such, the communication device generally comprises a modem, server, wireless transmitters or other devices for communicating with devices on the network 201. The memory device typically comprises a non-transitory computer readable storage medium, comprising computer readable/executable instructions/code, such as the computer-readable instructions, as described below.

As further illustrated in FIG. 1, the entity system 210 comprises computer-readable instructions or computer readable program code stored in the memory device, The computer readable instructions, when executed by the processing device 138 are configured to cause the processing device to perform one or more steps described in this disclosure such as to provide entity specific forms to the network 201.

It is understood that the servers, systems, and devices described herein illustrate one embodiment of the invention. It is further understood that one or more of the servers, systems, and devices can be combined in other embodiments and still function in the same or similar way as the embodiments described herein.

Figure 2:
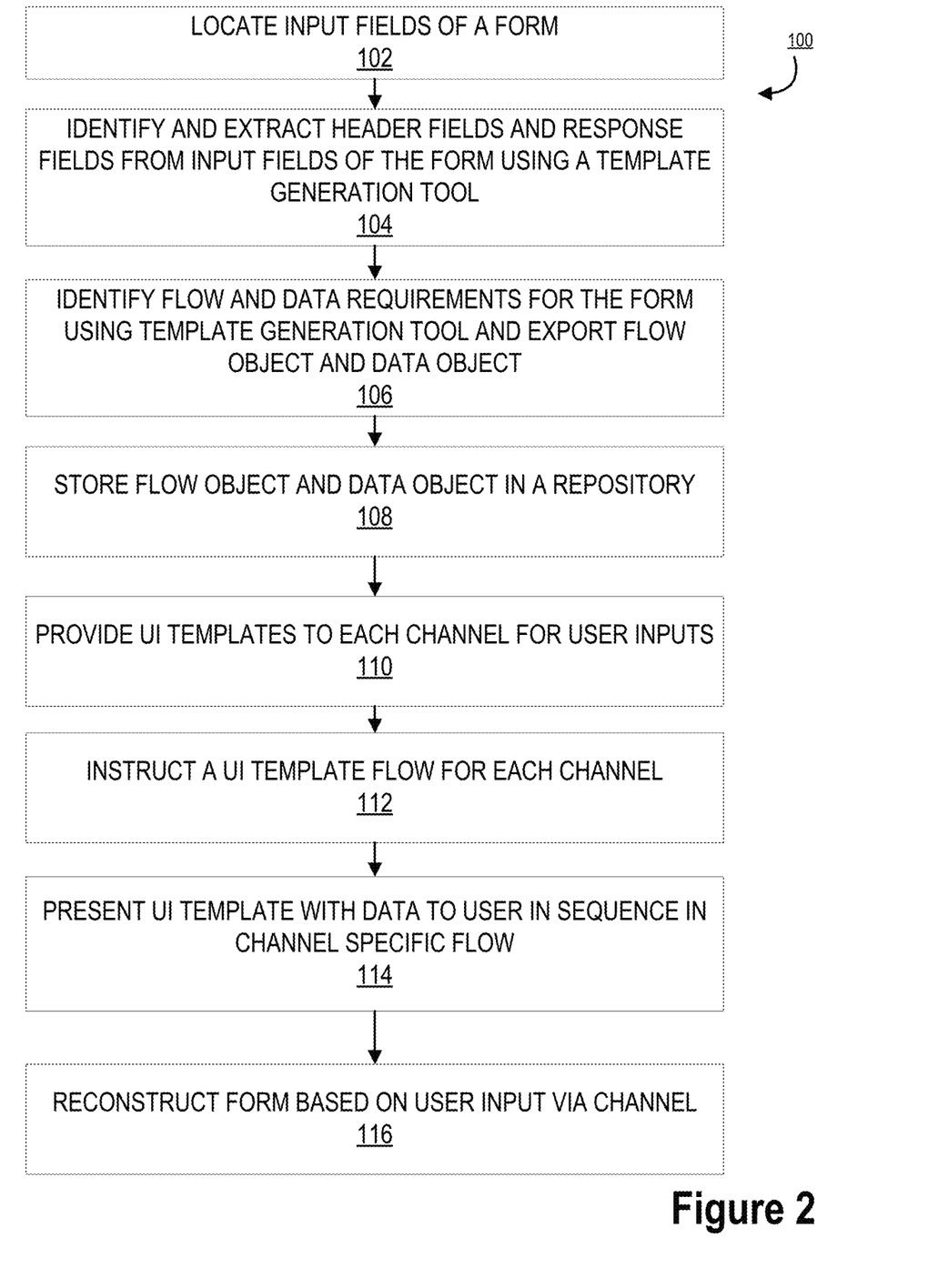
FIG. 2 illustrates a high level process flow of the cross channel digital data parsing and generation process, in accordance with one embodiment of the invention.

FIG. 2 illustrates a high level process flow of the cross channel digital data parsing and generation process 100, in accordance with one embodiment of the invention. As illustrated in block 102, the process 100 is initiated by locating the particular input fields or sections of the form that require user input. This may be specific questions, prompts, choices, answers, or the like on the form requiring user input.

As illustrated in block 104, the process 100 continues by identifying and extracting the elements of the user input fields of the form. In some embodiments described herein, the system may scan, parse, and export the text and other information of a form in an automated fashion. In this way, the system may identify the data that comprises the question header fields, response fields, and/or input requirements for the user. This may also include features of the header or response field(s) such as the type of input, such as a drop down selection, check box selection, fill in, or the like. This may also include specific features about the response fields such as maximum character limits, required font, color, any pre-filled responses or other pre-existing text, or paragraph input formatting requirements, or the like. In some embodiments of the invention, the user associated with an entity may be provided with an opportunity to correct any mistakes which may have occurred during the location and extraction process. In other embodiments described herein, the contents of the form may be manually input by a user associated with an entity into the template generation tool.

As illustrated in block 106, the process 100 continues by identifying flow and data requirements for the form and exporting flow object and data object for each response field and/or header field. In some embodiments of the invention, the flow object and data object for each response field may be paired together during export. In another embodiment of the invention, the flow object and data object for each response field may be exported individually. In yet another embodiment of the invention, the flow objects and data objects for an entire form may be exported together as a whole.

As illustrated in block 108, the process 100 continues by storing the flow object and the data object in a repository. In some embodiments of the invention, the flow object and data object for each response field may be paired and stored together. In another embodiment of the invention, the flow object and data object for each response field may be stored individually. In yet another embodiment of the invention, the flow objects and data objects for an entire form may be stored in a repository together as a whole.

In some embodiments of the invention, it should be understood that flow objects and/or data objects, when exported or stored in a repository, may be duplicates of existing flow objects and/or data objects in the repository. In this way, instead of storing duplicates of these objects, some embodiments described herein may instead note that a duplicate flow object and/or data object already exists in the repository, and automatically link the existing flow object and/or data object with the objects being generated in the template generation tool. In this way, storage space on the repository may be optimized, and pre-existing user responses for data objects can be pre-populated in the channel-specific form prior to a user being prompted for a response. Described another way, the form presented to a user on a channel within a UI template of a channel may reference one or more data objects and/or one or more flow objects which are commonly used in one or more other forms across an entity.

As illustrated in block 110, the process 100 continues by providing one or more UI templates to each channel for user inputs. This may include one or more types of user inputs, but may include the coloring, formatting, and the like associated with the channel such that the flow of the page will be similar to the channel pages visualized by the user. The UI template comprises a data object and a flow object once the UI template has been implemented at a channel and a form is presented to a user.

The process 100, continues by instructing a UI template flow for each channel associated with a user based on the particular sections of the form requiring user input, as illustrated in block 112. In this way, the first portion of the form may require a check box selection and the second portion of the form may require a fill in section. The system may instruct the channel to utilize a UI template associated with a check box selection first, followed by a UI template associated with a fill in section.

The one or more UI templates from the channel are then presented to the user with the data in a sequenced order, as illustrated in block 114. The data is presented in channel specific flow, such that the channel font, color, and the like is channel specific, but the data provided is based on the form and the data extracted from the form.

Finally, as illustrated in block 116, the process 100 is finalized by reconstruction of the form based on user input at the channel.

Figure 3:
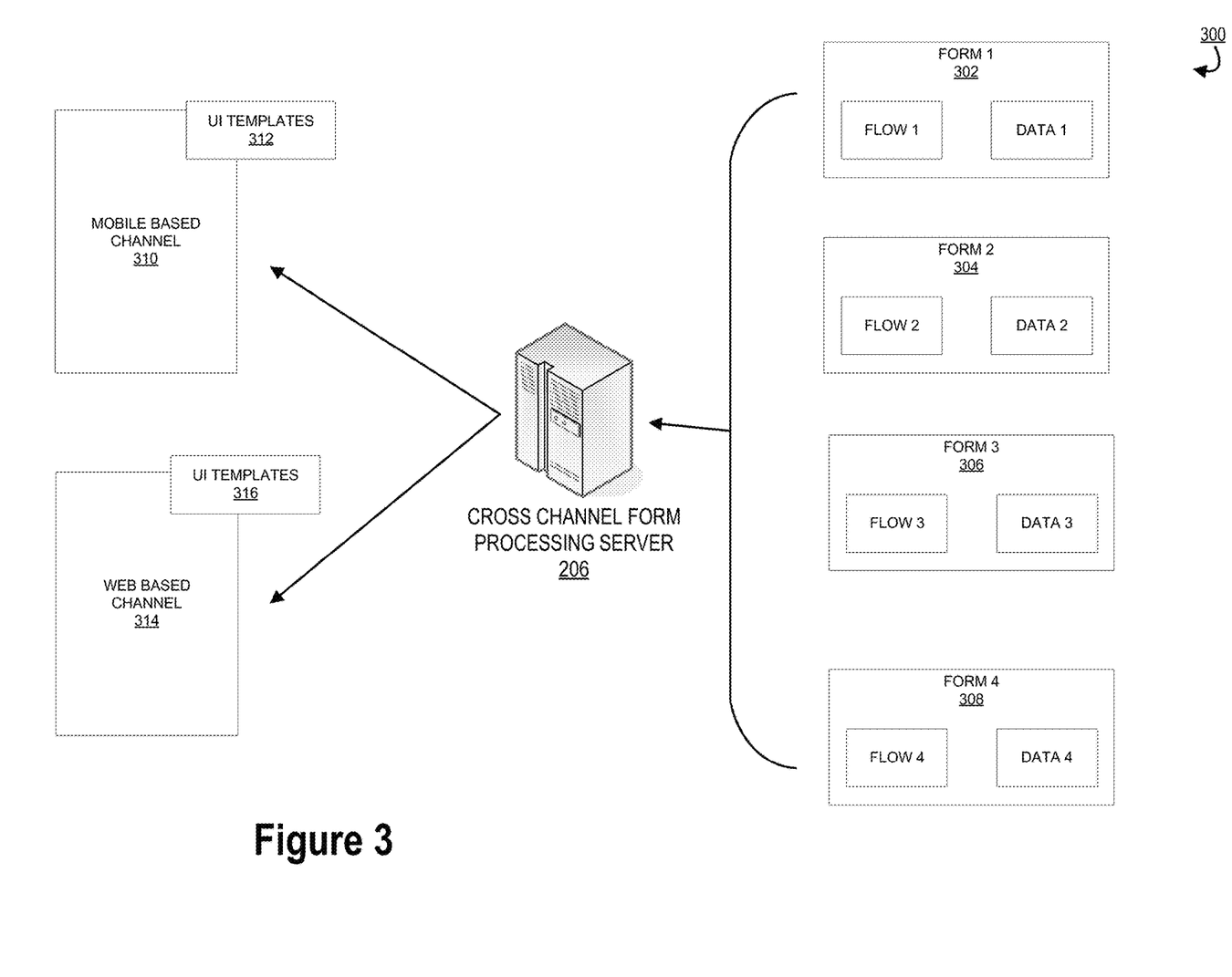
FIG. 3 illustrates a high level process flow of the cross channel digital data parsing and generation system interactions, in accordance with one embodiment of the invention.

FIG. 3 illustrates a high level process flow of the cross channel digital data parsing and generation system interactions 300, in accordance with one embodiment of the invention. As illustrated, the cross channel form processing server 206 may accept forms from one or more entities for user input. These forms may include Form 1 302, Form 2 304, Form 3 306, and Form 4 308. One will appreciate that while only four forms are illustrated in FIG. 3, there may be many more forms associated with the system. Each form may have a flow and a data associated with it. The flow may be the visual aspects of the form, such as the color, font, type, and the like. The data may include the specific questions the form may ask the user.

The cross channel form processing server 206 may provide the data for each form in a specific parsed-out order to each channel. As illustrated in FIG. 3, the mobile based channel 310 and the web based channel 314 are illustrated. While only two channels are illustrated, one of skill in the art will appreciate that several other channels may be available for a user to access a form. As illustrated, each channel has a pre-stored UI template. The mobile based channel 310 has mobile UI templates 312 and the web based channel 314 has UI templates 316. These templates comprise the font, color, format, and the like associated with the channel. The cross channel form processing server 206 provides the data from the various forms in a specific order to the channel for user display via the channel.

Figure 4:
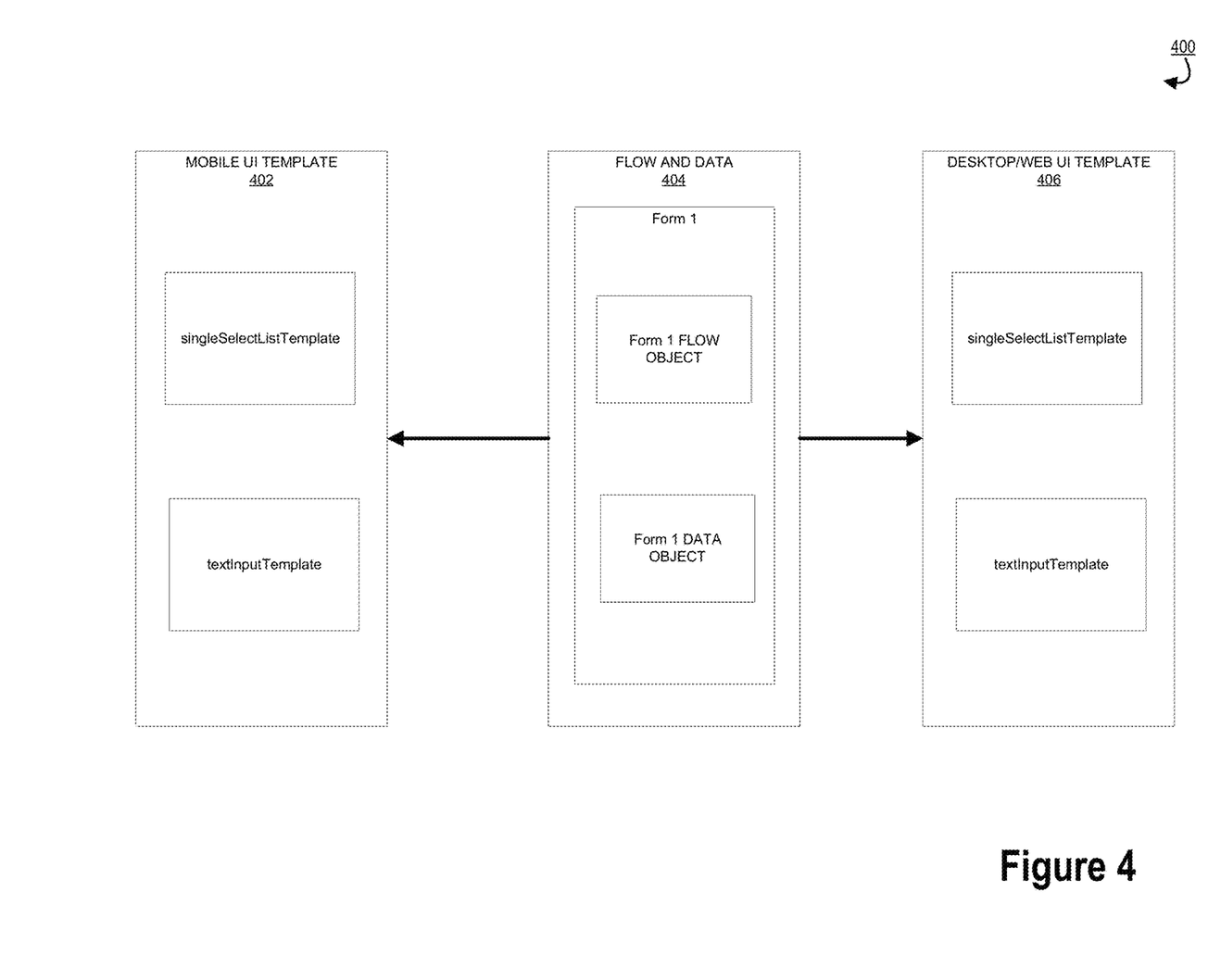
FIG. 4 illustrates a high level process flow of template ownership across the cross channel digital data parsing and generation system.

FIG. 4 illustrates a high level process flow of template ownership across the cross channel digital data parsing and generation system 400, in accordance with one embodiment of the invention. This illustrates the communication with the system to the channel in order for the channel to know what UI template to present, the order to present the UI template, and the data to present via the UI template. The system trains the channel to perform the logic, present the questions, and transmit the data back to the system. The system utilizes an open standard file format and data interchange format that uses human-readable text to store and transmit data objects consisting of attribute, such a value pairs and arrays. This may include JSON or the like file objects. The system uses two of these open standard file objects, a flow object and a data object.

As illustrated in block 404 the flow and data objects are provided to the channel. The flow object provides instructions for the flow of UI templates for the channel to user, additional validation rules to apply to each UI template, and provides an indication of it there are any interdependent UI templates (for example, a second question in a string of questions is dependent on how the user answers the first question in the string). The data object provides the actual text or words that needs to be displayed or transmitted to the user on the user device, such as a question "what is your name" or the like. The objects are channel agnostic and does not contain any colors, formats, fonts, or the likes associated with the data.

The flow and data 404 are transmitted to the channel systems. These may be a mobile device or a desktop device or the like. As illustrated in FIG. 4, the flow and data 404 may be transmitted to a mobile device. The mobile UI template 402 is pre-populated at the channel level and is able to accept the flow and data 404 to transmit a display of the information on the user device via the mobile channel. The mobile UI template 402 comprises the various ways in which the data is displayed, such as via a selection list or via user text input. As such, if the flow and data 404 require a user to input text into a field of the form, the mobile UI template will display the form data via the textInputTemplate. If the flow and data 404 require a user to select a box or select an item within the form, the mobile UI template will display the form data via the singleSelectListTemplate.

The desktop/web UI template 406 is pre-populated at the channel level and is able to accept the flow and data 404 to transmit a display of the information on the user device via the desktop or web channel. The desktop/web UI template 406 comprises the various ways in which the data is displayed, such as via a selection list or via user text input. As such, if the flow and data 404 require a user to input text into a field of the form, the desktop/web UI template will display the form data via the textInputTemplate. If the flow and data 404 require a user to select a box or select an item within the form, the desktop/web UI template will display the form data via the singleSelectListTemplate.

Figure 5:
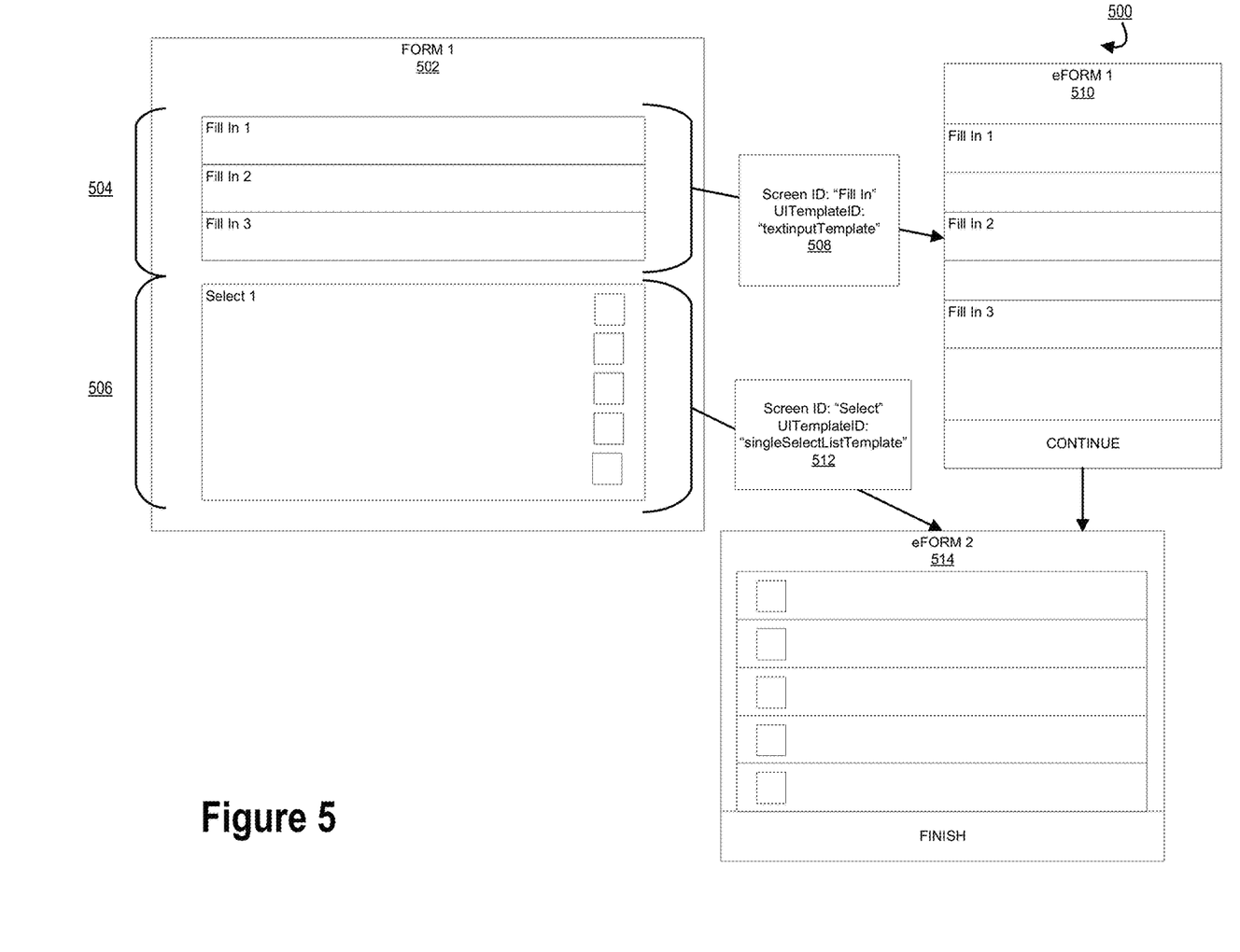
FIG. 5 illustrates a high level process flow illustrating the process of form breaking down into UI templates for channel distribution, in accordance with one embodiment of the invention.

FIG. 5 illustrates a high level process flow illustrating the process of form breaking down into UI templates for channel distribution 500, in accordance with one embodiment of the invention. No matter how the form looks the invention does not present the form and its complexities as is to the user. The system breaks down the original form into sets of inputs for the user. The system identifies the parts of the form that require user input, response fields, and transmit those parts of the form to the user. The system also identifies the parts of the form that prescribe to the user what the input section is to be used for. These parts of the form are also known as header fields. The user device is pre-populated with the appropriate channel specific format, color, and the like for the data. The system then presents these fields to the user in the channel associated with the user device.

For example, as illustrated in FIG. 5, Form 1 502 is identified to have two response fields that require user input. These include a fill-in response field 504 and a selection response field 506. In this way, the system identifies the locations on a form that the user is required to put an input. This input could be writing or filling in a portion, such as writing a name, date, or other information. This input could be selecting a box, selecting one option from several options, radio buttons, calendars, notes, drop down selection, signature, and the like. With these limited input options, the system is able to generate almost every possible form a user may need to populate based on mixing and matching the various input options in order to create any number of forms regardless of form complexity. The system identifies two sections in Form 1 502, one section that the user is required to fill in the blank 504 and one section where the user is required to check one or more boxes 506. The complexity of Form 1 502 outside of these two sections is irrelevant and is not transmitted to the user channel.

Each channel will have pre-programed input templates that are called UI templates. Each channel has the pre-programmed UI templates, that for any type of form the system may notify the channel of the order of the pre-programmed UI templates for each type of form. For example, for the form illustrated in FIG. 5, the system may notify the channel to utilize pre-programmed UI template "testinputTemplate" followed by pre-programmed UI template "singleSelectListTemplate", which correspond to the type of input the user may be required to provide. The channel may input the data from the system into the pre-programmed UI template to generate a displayable form to the user in the appropriate channel format. The system may collect the data from the channel and populate the original form for uniformity.

As illustrated in block 508, the system processes the fill in the blank 504 section and provides information to the channel to present the section to the user in the form of the eForm 1 510. This includes a screen identification, a UI template identification for the channel, and the user input to put into the eForm 1 510.

Furthermore, the system may select an order of eForms, such as presentation of eForm 1 510 first then eForm 2 514. After the user has filled in Fill in 1, Fill in 2, and Fill in 3, the user may select continue. Upon selection, the user may be presented eForm 2 514. eForm 1 510 and eForm 2 514 may be part of the same Form 502 but the system may divide them based on user input type for appropriate channel UI template presentation for the various parts of the form 1 502. For eForm 2 514, instructions such as the screen identification, UI template identification, and the data to be presented may be transmitted to the channel for display as illustrated in block 512.

Figure 6A:
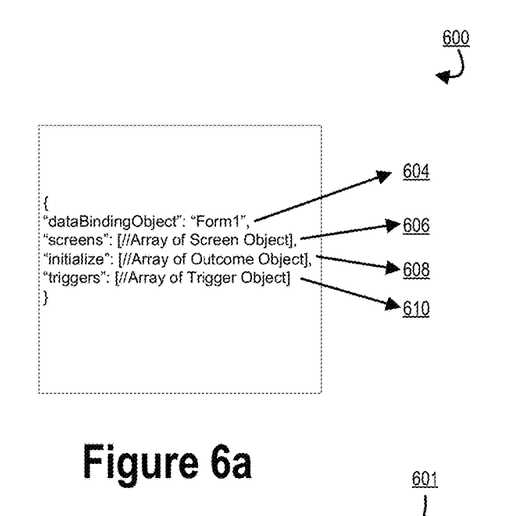
FIG. 6a illustrates a high level flow object structure, in accordance with one embodiment of the invention.

FIG. 6a illustrates a high level structure of flow object 600, in accordance with one embodiment of the invention. This illustrates the communication with the system to the channel in order for the channel to know which UI template present to the user, the order to present to the user, and the data to present. The system trains the channel to perform the logic, present the questions, and transmit the data back to the system. The system utilizes an open standard file format and data interchange format that uses human-readable text to store and transmit data objects consisting of attribute, such a value pairs and arrays. This may include JSON or the like objects. The system uses two of these open standard file objects: a flow object and a data object. The flow object 600 has the flow of UI templates for the channel to user, additional validation rules to apply to each UI template, and provides an indication of it there are any interdependent UI templates (for example, a second question in a string of questions is dependent on how the user answers the first question in the string).

In this way, each UI template has an array of flow objects 600, each flow object 600 has an array of triggers, each trigger object has an array of outcomes, each outcome object has an array of predicates and an array of actions.

As illustrated in section 604 the flow object provides the corresponding data object file name associated with this flow object. Next, as illustrated in section 606 the flow object provides UI template instructions for all screens associated with the form, as represented in an array of Screen Objects. As illustrated in section 608, the flow object provides an array of outcome objects. These are used when the flow needs to be started with a different screen other than the first screen presented. As illustrated above in FIG. 5, a single form may be parsed into several different screens for the user to view the form appropriately at the channel. Finally, as illustrated in block 610, this flow object provides an array of trigger objects. These trigger objects are used when common triggers are required across screens in order to reduce duplicate code.

Figure 6B:
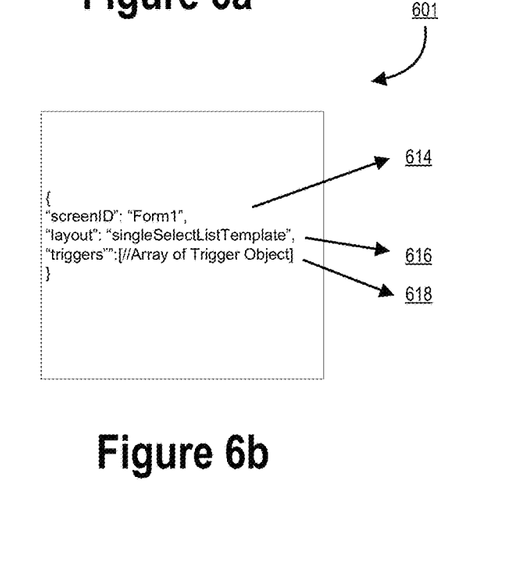
FIG. 6b illustrates a high level screen object structure, in accordance with one embodiment of the invention.

FIG. 6b illustrates a structure of a screen 601, in accordance with one embodiment of the invention. The flow object 600 comprises the screen object 601. As illustrated each screen object 601 would have a name, the one illustrated in FIG. 6b is Form 1 614. This is the screen identification set by the channel for every screen. This identification is used for mapping the screen data in the data object. Next, as illustrated in section 616, the UI template to be used in the screen of the user is provided, which in this case is singleSelectListTemplate, which is a selection list that allows a user to select one of a list of options. This UI template has to match the UI template pre-populated and published to the channel. Finally, as illustrated in section 618, array of triggers associated with the screen are provided. This is where all the click actions and order of selection is provided for user navigation. The trigger is the selection of a response by the user or a user entering data into a text box. This trigger confirms that the user performed the correct trigger and allows for proceeding to the next question within the form.

Figure 6C:
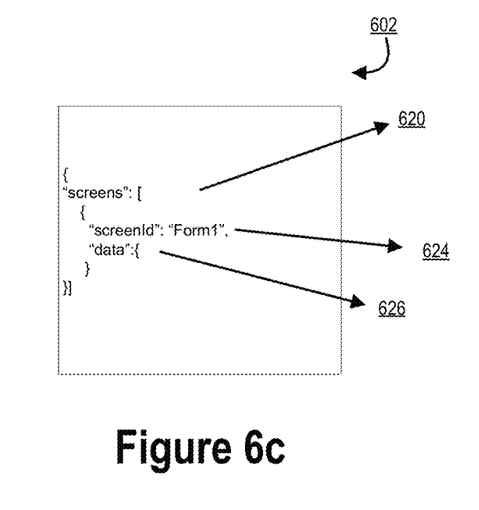
FIG. 6c illustrates a high level data object structure, in accordance with one embodiment of the invention.

FIG. 6c illustrates a high level structure of a data object 602, in accordance with one embodiment of the invention. The data object 602 provides the UI template with the data and text to be inputted into the UI. As illustrated in section 620, the data object 602 provides an array of screen data objects for the particular flow. Next, as illustrated in section 624 the screen identification is matched and identified as Form 1. Finally, as illustrated in section 626 the data object defines an object with a key value pair. The key value pair is a variable defined in the screen and value is the one to be replaced with. In this way, the data object structure provides the text of the form to the UI for display in the channel specific manner.

Figure 7:
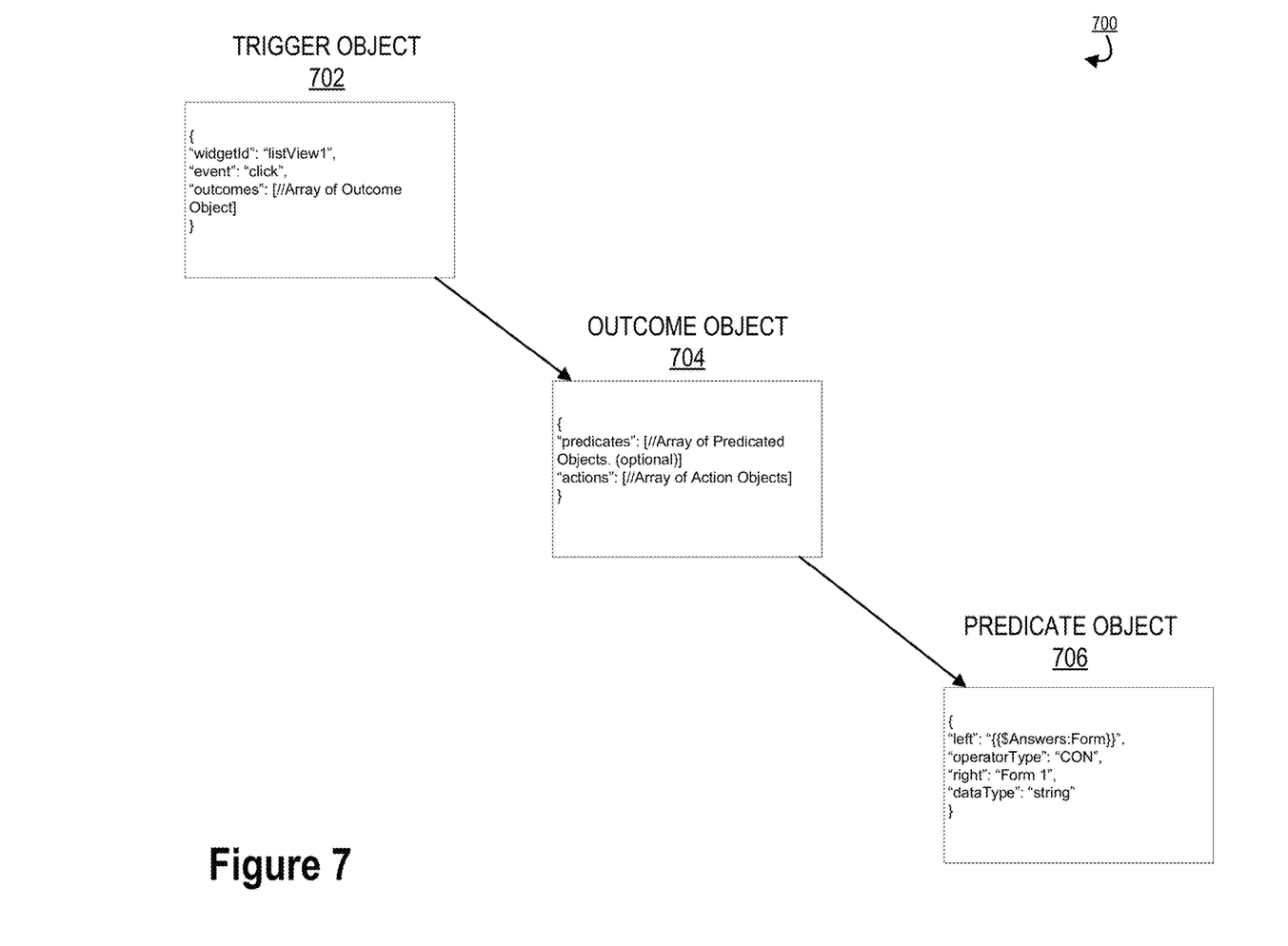
FIG. 7 illustrates a high level flow of a trigger object, in accordance with one embodiment of the invention.

FIG. 7 illustrates a high level flow of a trigger object 700, in accordance with one embodiment of the invention. The flow object 600 comprises the trigger object 700. As illustrated in block 702 the trigger object contains an UI identifier associated with the form and the event. The event associated with the user action, in this case the action is a "click" followed by a list of possible outcomes associated with the user action. This outcome can include collecting data, moving to the next UI template screen or the like.

Next, as illustrated in block 704, the process 700 continues to the outcome object. The outcome object 704 comprises predicates that provides a list of conditions that need to be satisfied before executing the action. Predicates are prerequisites that are required before an outcome can be produced. For example, if the form asks for an email address of the user, the predicate can confirm that the user is inputting text, such as an "@" that delineates the user has inputted what appears to be an appropriate input for the question. Furthermore, the outcome object 704 provides an array of actions that need to be executed based on the user actions, which are outlined in further detail below in FIG. 8a and FIG. 8b.

Finally, as illustrated in block 706, the process 700 is finalized with the predicate object. The predicate object 706 provides a static or dynamic equation with a type of operation that is needed to be performed and the data type for the information, such as strings, numbers, dates, or the like.

Figure 8A:
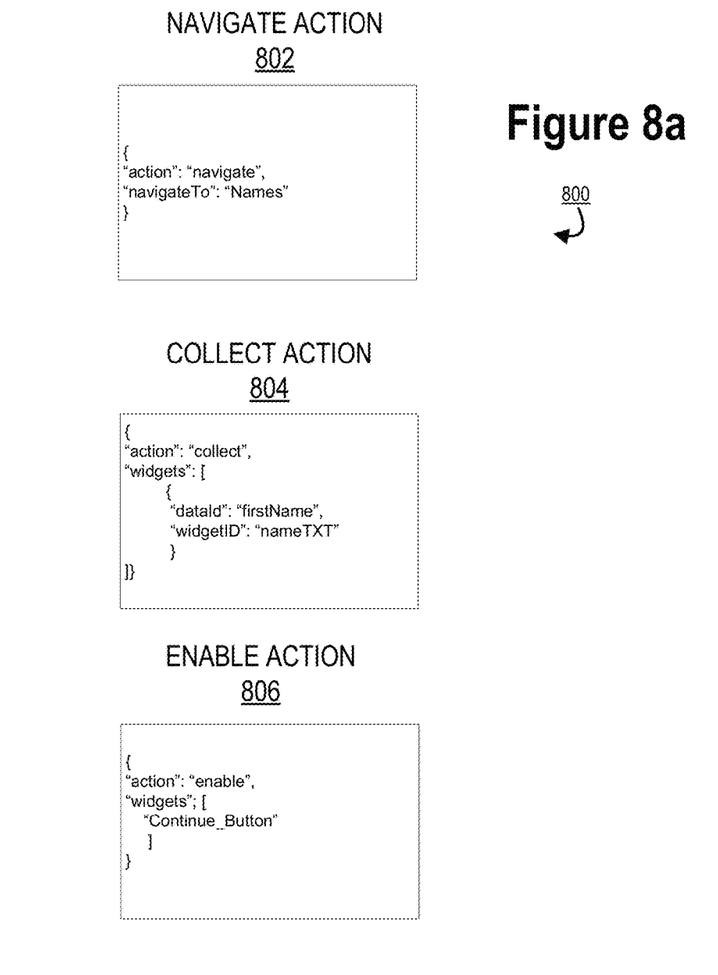
FIG. 8a illustrates a high level flow object for navigation actions, in accordance with one embodiment of the invention.

FIG. 8a illustrates a high level flow object for navigation actions 800, in accordance with one embodiment of the invention. The navigation actions 802 include a definition of the type of action to be performed by the user and defines the next screen to navigate to based on the action. Next, the collect action 804 includes a definition of the action to be performed, and an array of elements for which data needs to be collected for that action. Furthermore, the collect action 804 defines the key to where the data needs to be mapped to and the UI template identifier associated with the data collection. Finally, the enable action 806 defines the type of action to be performed and provides an array of UI identifiers as strings that need to be enabled.

Figure 8B:
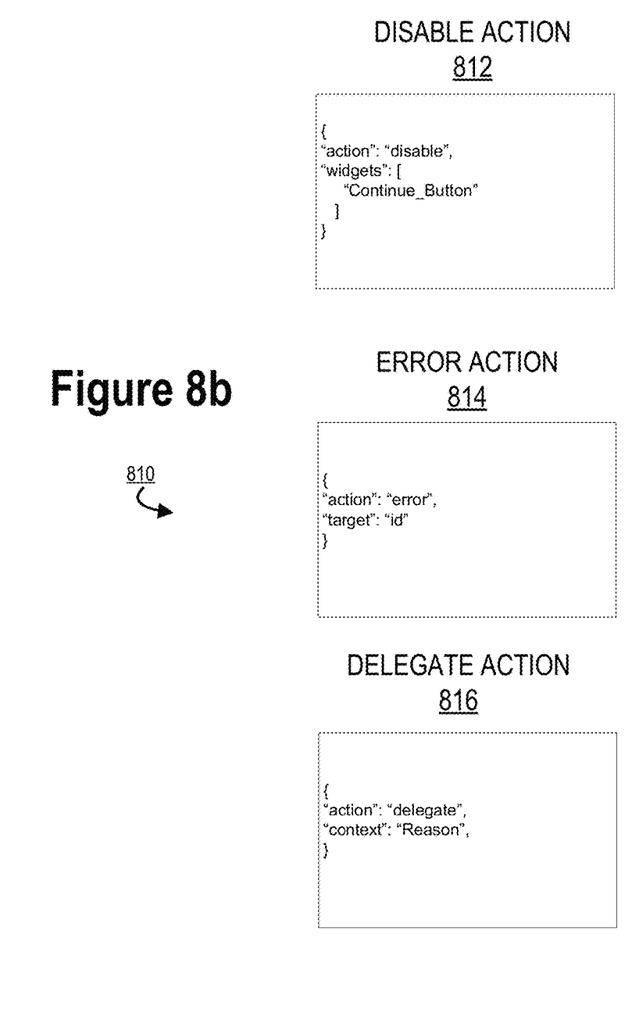
FIG. 8b illustrates a high level flow object for disable actions, in accordance with one embodiment of the invention.

FIG. 8b illustrates a high level flow object for disable actions 810, in accordance with one embodiment of the invention. As illustrated in the disable action 812, the process 810 is initiated by defining the type of action to be performed and provides an array of UI template identifiers as strings that need to be disabled. The error action 814 defines the type of action to be performed and identifies the UI element that needs to be shown based on the error. Finally, the delegate action 816 defines the type of action to be performed and provides the context and/or reason for the delegation of the action back to the wrapper to handle the specific function.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for cross channel digital data parsing and generation, the system comprising:
    a memory device with computer-readable program code stored thereon;
    a communication device;
    a processing device operatively coupled to the memory device and the communication device, wherein the processing device is configured to execute the computer-readable program code to:
        receive a form comprising one or more input fields to be completed by a user;
        locate the one or more input fields of the form to be completed by the user, the one or more input fields comprising one or more header fields and one or more response fields;
        extract information from the form, wherein the extracted information comprises the one or more header fields, the one or more response fields, and a type of input, wherein the type of input is selected from at least one of a group consisting of a drop down selection, a fill in, and a check box selection;
        insert the extracted information into a template generation tool;
        present the template generation tool to a user associated with an entity on a graphical user interface;
        receive form prompt rules as an input on the template generation tool, wherein form prompt rules comprises display rules and transition rules;
        generate outputs from the template generation tool, the outputs comprising a data object that provides formatting instructions to a channel and a flow object that provides flow instructions to the channel, wherein if the outputs are duplicates of existing outputs stored in a repository from another instance of the template generation tool, the outputs are automatically linked to the existing outputs, and wherein the flow object and the data object are structured to be agnostic to a plurality of channels; and
        store the outputs in the repository.

2. The system of claim 1 further comprising validation, wherein the user associated with the entity corrects any errors in the extracted information.

3. The system of claim 1 further comprising displaying, via a user interface of the channel, to the user the form in an appropriate channel format, wherein the flow object provides the channel with a flow of User Interface (UI) templates to present to the user.

4. The system of claim 1 wherein the data object and flow object further comprise additional security requirements for display of characters for the one or more input fields.

5. The system of claim 1 wherein storing the outputs in the repository further comprises storing the data object separate from the flow object for each input field.

6. The system of claim 1 wherein the template generation tool further comprises a preview function configured to provide a simulated channel using the flow object and the data object.

7. A computer program product for cross channel digital data parsing and generation, the computer program product comprising at least one non-transitory computer-readable medium having computer-readable program code portions embodied therein, the computer-readable program code portions comprising:
    an executable portion configured for receiving, a form comprising one or more input fields to be completed by a user;
    an executable portion configured for locating the one or more input fields of the form to be completed by the user, the one or more input fields comprising one or more header fields and one or more response fields;
    an executable portion configured for extracting information from the form, wherein the extracted information comprises the one or more header fields, the one or more response fields, and a type of input, wherein the type of input is selected from at least one of a group consisting of a drop down selection, a fill in, and a check box selection;

an executable portion configured for inserting the extracted information into a template generation tool;

an executable portion configured for presenting the template generation tool to a user associated with an entity on a graphical user interface;

an executable portion configured for receiving form prompt rules as an input on the template generation tool, wherein form prompt rules comprises display rules and transition rules;

an executable portion configured for generating outputs from the template generation tool, the outputs comprising a data object that provides formatting instructions to a channel and a flow object that provides flow instructions to the channel, wherein if the outputs are duplicates of existing outputs stored in a repository from another instance of the template generation tool, the outputs are automatically linked to the existing outputs, and wherein the flow object and the data object are structured to be agnostic to a plurality of channels; and an executable portion configured for storing the outputs in the repository.

8. The computer program product of claim 7 further comprising validation, wherein the user associated with the entity corrects any errors in the extracted information.

9. The computer program product of claim 7 further comprising displaying, via a user interface of the channel, to the user the form in an appropriate channel format, wherein the flow object provides the channel with a flow of User Interface (UI) templates to present to the user.

10. The computer program product of claim 7 wherein the data object and flow object further comprise additional security requirements for display of characters for the one or more input fields.

11. The computer program product of claim 7 wherein storing the outputs in the repository further comprises storing the data object separate from the flow object for each input field.

12. The computer program product of claim 7 wherein the template generation tool further comprises a preview function configured to provide a simulated channel using the flow object and the data object.

\* \* \* \* \*